(12) United States Patent
Kwon et al.

(10) Patent No.: US 9,007,422 B1
(45) Date of Patent: Apr. 14, 2015

(54) METHOD AND SYSTEM FOR MUTUAL INTERACTION USING SPACE BASED AUGMENTATION

(71) Applicant: Center of Human-Centered Interaction for Coexistence, Seoul (KR)

(72) Inventors: Joung Heum Kwon, Seoul (KR); Ji Yong Lee, Seoul (KR); Bum Jae You, Seoul (KR)

(73) Assignee: Center of Human-Centered Interaction for Coexistence, Seoul (KR)

( * ) Notice: Subject to any disclaimer, the term of this patent is extended or adjusted under 35 U.S.C. 154(b) by 0 days.

(21) Appl. No.: 14/580,208

(22) Filed: Dec. 22, 2014

(30) Foreign Application Priority Data

Sep. 3, 2014 (KR) .................. 10-2014-0117301

(51) Int. Cl.
*H04N 7/14* (2006.01)
*H04N 7/15* (2006.01)
*G06T 19/00* (2011.01)

(52) U.S. Cl.
CPC .............. *H04N 7/157* (2013.01); *G06T 19/006* (2013.01); *G06T 2219/024* (2013.01)

(58) Field of Classification Search
USPC ..................................................... 348/14.08
See application file for complete search history.

(56) References Cited

U.S. PATENT DOCUMENTS

| | | | |
|---|---|---|---|
| 2010/0146052 A1* | 6/2010 | Pare et al. ...................... | 709/204 |
| 2010/0153497 A1* | 6/2010 | Sylvain et al. ................. | 709/204 |
| 2010/0316284 A1* | 12/2010 | Jeong et al. ................... | 382/162 |
| 2012/0280996 A1* | 11/2012 | Kannan et al. ................ | 345/426 |
| 2013/0050201 A1* | 2/2013 | Dai ................................ | 345/419 |
| 2013/0222550 A1* | 8/2013 | Choi et al. ...................... | 348/47 |
| 2014/0139717 A1* | 5/2014 | Short .......................... | 348/333.1 |

FOREIGN PATENT DOCUMENTS

KR 10-1310498 10/2013

* cited by examiner

*Primary Examiner* — Joseph J Nguyen
(74) *Attorney, Agent, or Firm* — Husch Blackwell LLP

(57) ABSTRACT

A method makes a first and a second devices support for interactions with respect to a 3D object. The method includes steps of: (a) allowing the first device to acquire information on physical 3D object and information on images of a user; (b) allowing the second device to receive the information relating to the physical 3D object and the information on images of the user of the first device, then display virtual 3D object corresponding to the physical 3D object and display 3D avatar of the user of the first device; (c) allowing the first device to transmit information on manipulation of the user of the first device regarding the physical 3D object and information on images of the user of the first device who is manipulating the physical 3D object and then allowing the second device to display the 3D avatar of the user of the first device.

12 Claims, 8 Drawing Sheets

METHOD AND SYSTEM FOR MUTUAL INTERACTION USING SPACE BASED AUGMENTATION

CROSS REFERENCE TO RELATED APPLICATION

This application claims priority to and incorporates herein by reference all disclosure in Korean Patent Application No. 10-2014-0117301 filed Sep. 3, 2014.

FIELD OF THE INVENTION

The present invention relates to a method, and a system for mutual interactions by using space based augmentation; and more particularly, to the method, and the system for augmenting space information on a three-dimensional object existing on a user's space and providing the mutual interactions among users regarding the object.

BACKGROUND OF THE INVENTION

A remote video conference system is a system that enables two or more persons who are far away to interact with each other through a communication means. It is mainly used to minimize physical distance between a user's reality space and the other user's remote space felt by users.

The remote video conference system implements an environment as if two users sit across from each other by capturing an image on the side of one user in the remote space and transmitting it to the side of a local user and transmitting an image on the side of the local user to the side of the user in the remote space with displays and cameras. In other words, it provides a function for video dialogs between or among two or more persons.

As existing technical limitation, there is a problem of the existing function for video dialogs being insufficient to discuss a specific object existing on one user's space if such discussion is requested. In other words, to discuss the object, a course of manipulation, processing, etc. of a physical object and a virtual object by the user through augmented reality technology should be expressed, but the existing remote video conference system did not fully provide such functions.

In relation to augmented reality at a video conference, Korean Patent Registration No. 10-1310498 was disclosed. However, it discloses only a service relating to a 3D video conference. That is, it has the aforementioned problems of interactions with respect to the physical object of the virtual object.

Therefore, the present inventor came to develop a mutual interaction technology of allowing users on reality space and remote space to participate in a video conference and discussing a specific object effectively during the video conference.

SUMMARY OF THE INVENTION

It is an object of the present invention to solve all the problems mentioned above.

It is another object of the present invention to share a 3D object existing on a remote or a local space between users and allow interactions between users about the shared object.

In accordance with one aspect of the present invention, there is provided a method for making a first and a second communication devices support for interactions with respect to a three-dimensional (3D) object, including steps of: (a) allowing the first communication device to acquire information relating to a physical 3D object by taking shots of the physical 3D object in use of a camera module for augmentation and to acquire information on images of a user of the first communication device by taking shots of the user in use of a camera module for acquiring an image of a person; (b) allowing the second communication device to receive the information relating to the physical 3D object and the information on images of the user of the first communication device from the first communication device, then display a virtual 3D object corresponding to the physical 3D object as a 3D image by using the received information relating to the physical 3D object and display a 3D avatar of the user of the first communication device by using the received information on the images of the user of the first communication device; (c) allowing the first communication device to transmit information on manipulation of the user of the first communication device regarding the physical 3D object and information on images of the user of the first communication device who is manipulating the physical 3D object, if being acquired, to the second communication device and then allowing the second communication device to display a state of the 3D avatar of the user of the first communication device who is manipulating the virtual 3D object by using a display unit and a projector of the second communication device.

In accordance with another aspect of the present invention, there is provided a system for supporting an interaction with respect to a 3D object, including: a first communication device for taking shots of a physical 3D object; and a second communication device for outputting a virtual 3D object corresponding to the physical 3D object; wherein the first communication device acquires the information relating to the physical 3D object by taking shots of the physical 3D object in use of a camera module for augmentation and acquires information on images of a user of the first communication device by taking shots of the user of the first communication device in use of a camera module for acquiring an image of a person; wherein the second communication device receives the information relating to the physical 3D object and the information on images of the user of the first communication device from the first communication device, then displays a virtual 3D object corresponding to the physical 3D object as a 3D image by using the received information relating to the physical 3D object and displays a 3D avatar of the user of the first communication device by using the received information on the images of the user of the first communication device; and wherein the first communication device transmits information on manipulation of the user of the first communication device regarding the physical 3D object and information on images of the user of the first communication device who is manipulating the physical 3D object to the second communication device and then the second communication device displays a state of the 3D avatar of the user of the first communication device who is manipulating the virtual 3D object by using a display unit and a projector of the second communication device.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
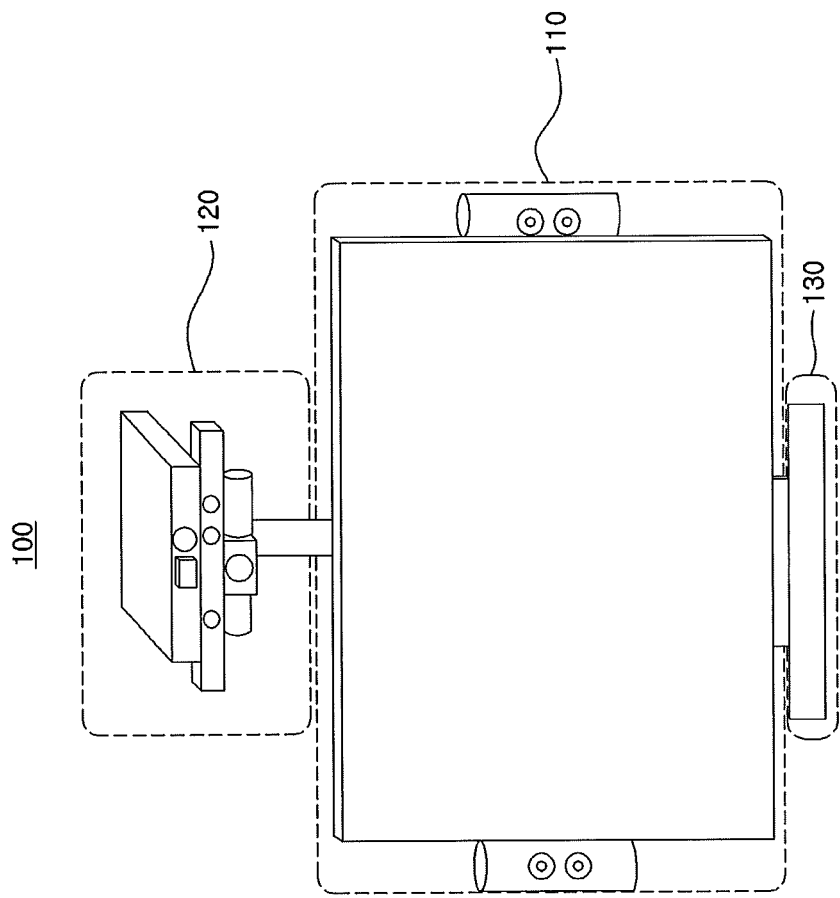
FIG. 1 is a drawing exemplarily showing a configuration of a communication device in accordance with the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Exemplary Configuration of Communication Device

FIG. 1 is a drawing exemplarily showing a configuration of a communication device in accordance with the present invention.

As illustrated in FIG. 1, a communication device 100 may include an imaging part 110, an augmentation part 120, and a communication part 130.

In accordance with one example embodiment of the present invention, the communication device 100 may provide a user with a mutual interaction function by using a space based augmentation. The communication device 100 may support an interaction between the user in a local space and the other user in a remote space with respect to a 3D object.

The imaging part 110 may provide the user with an image and sound of the other user's side, and may provide the other user with the image and sound of the user's side. In other words, the imaging part 110 may provide video dialogs between the user and the other user.

In accordance with one example embodiment of the present invention, the imaging part 110 may be a 3D imaging device.

The augmentation part 120 may process augmentation of the 3D object. The 3D object, as a target for augmentation, could be a physical one placed on the user's side or one placed on the other user's side. If the 3D object is placed on the other user's side, the augmentation part 120 may provide the user with a virtual 3D object corresponding to the physical 3D object placed on the other user's side by displaying the virtual 3D object in the user's local space. In addition, the augmentation part 120 provides users with a function of interaction with respect to the 3D object.

The communication part 130 of the communication device in the local space may perform a communication with that of the communication device in the remote space. The imaging part 110 and the augmentation part 120 of the communication device in the local space may transmit to, or receive from, the communication devices in the remote space various data through the communication part 130 of the communication device in the local space.

In accordance with one example embodiment of the present invention, at least some of the imaging part 110, the augmentation part 120, and the communication part 130 may be program modules communicating with an external system. Such program modules may be included in the communication device 100 in a form of an operating system, an application program module, and other program modules or physically stored in various storage devices well known to those skilled in the art. In addition, they may be stored in a remote storage device capable of communicating with the communication device 100. The program modules may include but not be subject to a routine, a subroutine, a program, an object, a component, and a data structure for executing a specific operation or a type of specific abstract data that will be described in accordance with the present invention.

The detailed operation of the communication device 100 will be explained below. First of all, the explanation of the whole system that uses two communication devices 100 will be made.

Figure 2:
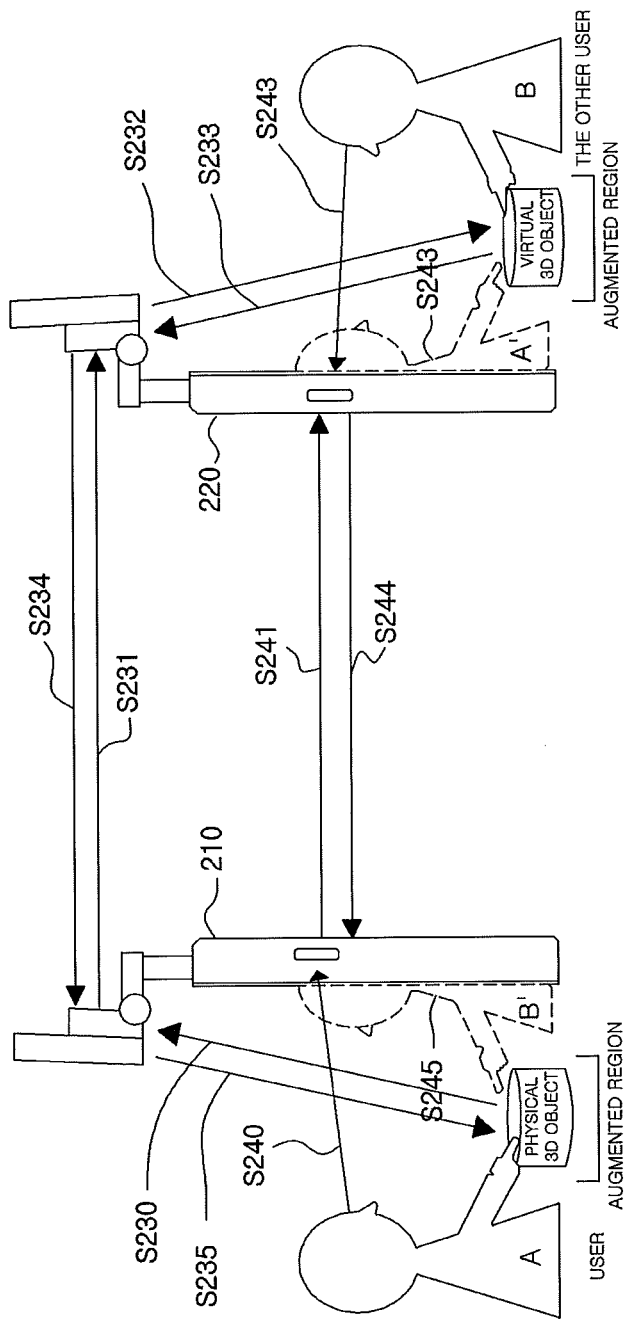
FIG. 2 is a drawing exemplarily representing a configuration of a whole system that supports an interaction between a user and the other user by using communication devices in accordance with the present invention.

Configuration of the Whole System that Supports Interactions on Object by Using Communication Devices FIG. 2 is a drawing exemplarily representing a configuration of a whole system that supports an interaction between the user and the other user of by using communication devices in accordance with the present invention.

The whole system of the present invention may be configured with two or more communication devices. In FIG. 2, a first communication device 210 and a second communication device 220 were illustrated as two communication devices 100 explained in FIG. 1. The first communication device 210 and the second communication device 220 may include the imaging part 110 and the augmentation part 120, respectively.

In accordance with one example embodiment of the present invention, the communication devices 100 may be divided into one device where the physical object is placed and the other device where the virtual object of the physical object is displayed. In FIG. 1, the first communication device 210 could be the communication device 100 for taking a shot of the physical object and the second communication device 220 could be the communication device 100 where the virtual object corresponding to the physical object is displayed.

One example embodiment of a method for the first communication device 210 and the second communication device 220 supporting the interaction with respect to the 3D object is explained. In FIG. 2, a first user of the first communication device 210 was indicated as "A" and a second user of the second communication device 220 as "B". The first user manipulates the first communication device 210 and the second user does the second communication device 220. The first user may perform the manipulation on the physical object placed on the first user's side and the second user the virtual object displayed on the second user's side.

By referring to FIG. 2, operations relating to the augmentation part 120 could be explained.

(i) The augmentation part 120 of the first communication device 210 may acquire information relating to the physical 3D object by taking a shot of the physical 3D object with a camera module of the first communication device 210 at a step of S230.

In accordance with one example embodiment of the present invention, the information relating to the physical 3D object may include information on the physical 3D object and on the first user's manipulating the physical 3D object. The information on the physical 3D object may be information on a shape, a size, a position, etc. with respect to the physical 3D object and the information on the first user's manipulating the physical 3D object may be information on various gestures applied to the physical 3D object. In other words, the information relating to the physical 3D object may be information on an image created by taking a shot of both the physical 3D object and the user's manipulating the physical 3D object.

For example, the user's manipulation on the physical 3D object may include at least one of drawing, painting and writing on the surface of the physical 3D object and furthermore may also include any actions of crushing or hitting the surface of the 3D object.

(ii) The communication part 130 of the first communication device 210 may provide the acquired information relating to the physical 3D object to the communication part 130 of the other user's second communication device 220 at a step of S231.

The communication part 130 of the second communication device 220 may receive the information relating to the physical 3D object from the first communication device 210.

(iii) The augmentation part 120 of the second communication device 220 may provide the other user with a virtual 3D object which is augmented by referring to the received information relating to the physical 3D object at a step of S232.

In other words, after receiving the information relating to the physical 3D object from the first communication device 210, the augmentation part 120 of the second communication device 220 may display the virtual 3D object, as a 3D image, corresponding to the physical 3D object on the first user's side by using the received information relating to the physical 3D object. In addition, the augmentation part 120 of the second communication device 220 may display the result of the first user's augmented manipulation on the physical 3D object as a current state of the virtual 3D object.

If the virtual 3D object is displayed, the second user may perform the manipulation on the virtual 3D object, which may be that on the virtual 3D object as a 3D image to which the information relating to the physical 3D object is displayed to the second user's side.

(iv) The augmentation part 120 of the second communication device 220 may acquire information on the second user's manipulation relating to the virtual 3D object at a step of S233.

The augmentation part 120 of the second communication device 220 may acquire the information on the second user's manipulation relating to the virtual 3D object by taking a shot of the virtual 3D object in use of a camera module of the second communication device 220.

(v) The communication part 130 of the second communication device 220 may transmit the information on the second user's manipulation relating to the virtual 3D object to the communication part 130 of the first communication device 210 at a step of S234. The communication part 130 of the first communication device 210 may receive the information on the second user's manipulation relating to the virtual 3D object from the second user's second communication device 220.

(vi) The augmentation part 120 of the first communication device 210 may provide the user with an image, as a result of the second user's manipulation, augmented to the physical 3D object at a step of S235. The augmentation part 120 of the first communication device 210 may augment the image including information on the second user's manipulation to the physical 3D object by using a projector of the first communication device 210.

Next, an operation relating to the imaging part 110 is explained.

(vii) The imaging part 110 of the first communication device 210 may acquire information on the first user's image by taking a shot of the first user with a camera module at a step of S240.

(viii) The communication part 130 of the first communication device 210 may transmit the information on the first user's image to the communication part 130 of the second communication device 220 on the second user's side at a step of S241.

(ix) The imaging part 110 of the second communication device 220 may display the first user's image by using the information on the first user's image at a step of S242.

In accordance with one example embodiment of the present invention, after receiving the information on the image of the user of the first communication device 210, the second communication device 220 may output a 3D avatar of the first user by using the received information on the first user's image and augment an action of the 3D avatar of the first user performing an interaction on the virtual 3D object, e.g., the avatar's expression and finger movement, etc. to the virtual 3D object to make the second user feel as if the 3D avatar of the first user manipulated the virtual object in the space of the second user. In FIG. 2, a 3D image of the first user is illustrated as a virtual first user A' through the imaging part 110 of the second communication device 220. In other words, the imaging part 110 of the second communication device 220 may reproduce as if an action taken against the physical 3D object by the first user were also taken against the virtual 3D object on the second user's side by displaying the 3D image on the first user's side. Accordingly, a natural interaction between the first user and the second user regarding the 3D object may be done. The imaging part 110 may include a display unit and the display unit of the imaging part 110 could be used to display the 3D avatar, which may be a 3D image of a user captured through a camera or an image configured to model in the same manner with computer graphics (CG).

Through the reproduction, the second user B and the virtual first user A' may input texts, drawings, etc. on the surface of the virtual 3D object on the second user's side.

(x) The imaging part 110 of the second communication device 220 may acquire the information on the second user's image by taking shots of the second user in use of a camera module of the second communication device 220 at a step of S243.

(xi) The communication part 130 of the second communication device 220 may transmit the information on the image on the second user's side to the communication part 130 of the first communication device 210 on the first user's side at a step of S244.

The communication part 130 of the first communication device 210 may receive the information on the second user's image from the communication part 130 of the second communication device 220 of the second user.

(xii) The imaging part 110 of the second communication device 220 may output the second user's image by using the information on the second user's image at a step of S245.

In accordance with one example embodiment of the present invention, the first communication device 210 may augment an interaction of the second user with respect to the virtual 3D object to the physical 3D object by displaying the 3D avatar of the second user in use of the information on the second user's image. In FIG. 2, a 3D image on the second user's side is illustrated as the virtual second user B'. By displaying the 3D image on the second user's side through the imaging part 110 of the first communication device 210, the imaging part 110 of the first communication device 210 may reproduce as if an action taken against the virtual 3D object by the second user were also taken against the physical 3D object on the first user's side.

Through the reproduction, the first user A and the virtual second user B' may input texts, drawings, etc. on the surface of the physical 3D object on the first user's side.

Through the aforementioned steps from S230 to S245, the first and the second users may perform an interaction with the other party through an image of the other party transmitted from a remote place. Through the interaction, the first and the second users may share and communicate information on a specific 3D object with each other.

In accordance with one example embodiment of the present invention, the aforementioned manipulation on the 3D object may be made through a fingertip of the first or the second user. The second communication device 220 of the second user may provide a function of manipulation such as selecting a surface of the displayed virtual 3D object, moving or rotating the virtual 3D object, or drawing on a selected region of the virtual 3D object. Besides, the first communication device 210 of the first user may also provide a function of manipulation such as drawing on a selected region of the physical 3D object. The images created by the manipulation on the first and the second users may be shared by both users through a network.

In accordance with one example embodiment of the present invention, a mode of selection, a mode of manipulation, and a mode of drawing as an interaction may be exemplarily provided. The user may convert modes through at least one menu provided through the imaging part 110, etc. of the communication device 100.

In the selection mode, the user may select one of one or more objects as an object of interest and selects a specified range of the object. For example, the user may touch the 3D object on the user's table in order to share a specific 3D object placed on the other user's table of a remote place and then interact with each other. The augmentation part 120 may select the touched 3D object and calculate the current state thereof. The state of the 3D object may include 3D coordinate and direction vectors. Through the selection mode, other menus than the selection mode may be selected or a position of a camera of the other user's communication device 100 may be changed as well.

In the manipulation mode, the user may move or rotate the virtual 3D object. For example, the 3D object may be moved by clicking and dragging a central point thereof. It may also be rotated by clicking and dragging a surrounding region thereof.

In the drawing mode, the user may draw a picture on the virtual or the physical 3D object. The drawn picture may be transmitted to the other party as an image. If a fingertip of the user moves, the augmentation part 120 may create points corresponding to the position of the fingertip and then create an image corresponding to the movement of the fingertip by creating links according to the created points. For example, such links may be converted in several colors through a manipulation on a palette provided by the imaging part 110.

Although it was exemplarily explained that the physical 3D object is placed on the first user's side and the virtual 3D object is placed on the second user's side in FIG. 2, but of course, vice versa. In other words, it would be possible to set that the user B where the virtual 3D object is placed is the first user and the user A on the other side is the second user.

By referring to FIG. 2, the order of the performance of the aforementioned steps S230 to S245 is not fixed. The steps may be performed in parallel or in rotation. For example, a method for the first communication device 210 and the second communication device 220 supporting an interaction on the 3D object in accordance with one example embodiment of the present invention may be made through the steps as shown below.

(i) The first communication device 210 may acquire information relating to the physical 3D object by taking a shot of the physical 3D object in use of a camera module for augmentation of the first communication device 210 and may acquire information on the image of the user of the first communication device 210 by taking the shot of the user of the first communication device 210 in use of a camera module for acquiring an image of a person.

(ii) After receiving the information relating to the physical 3D object and the information on the image of the user of the first communication device from the first communication device 210, the second communication device 220 may output the virtual 3D object corresponding to the physical 3D object by using the received information relating to the physical 3D object as a 3D image and output a 3D avatar of the user of the first communication device 210 by using the received information on the image of the user thereof.

After receiving the information on the image of the user of the second communication device 220 from the second communication device 220, the first communication device 210 may display a 3D avatar of the user of the second communication device 220 by using the information on the image of the user thereof.

(iii) If information on manipulation of the user of the first communication device 210 on the physical 3D object and the information on the image of the user thereof is acquired, the first communication device 210 may transmit the information to the second communication device 220 and the second communication device 220 may display a state of the 3D avatar of the first communication device 210 that is manipulating the virtual 3D object by using the display unit and a projector of the second communication device 220.

If information on manipulation of the user of the second communication device 220 on the virtual 3D object and information on the image of the user thereof is acquired, the second communication device 220 may transmit the information to the first communication device 210 and the first communication device 210 may display a state of the 3D avatar of the second communication device 220 that is manipulating the physical 3D object by using the display unit and a projector of the first communication device 210.

Detailed Configuration of Imaging Part 110 and Augmentation Part 120

Figure 3:
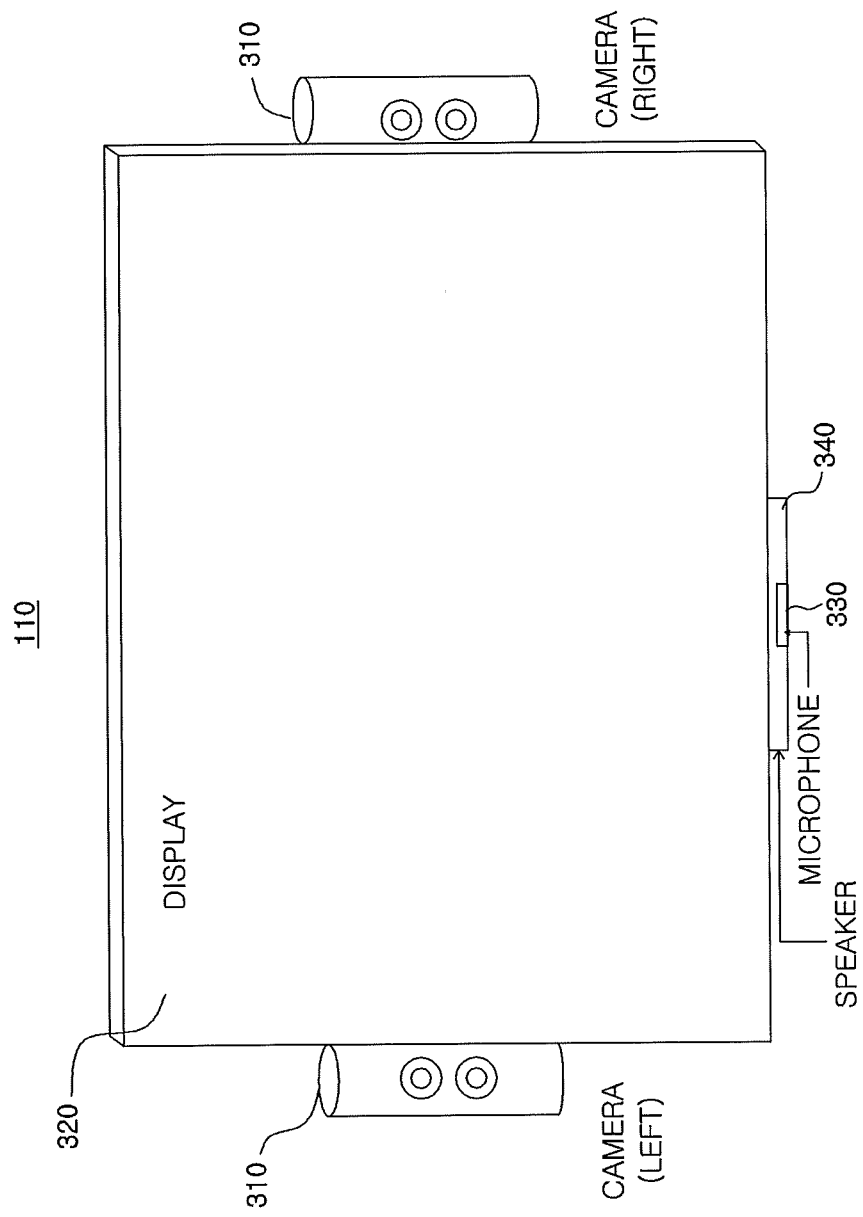
FIG. 3 explains a configuration of an imaging part in accordance with one example embodiment of the present invention.

FIG. 3 explains a configuration of an imaging part 110 in accordance with one example embodiment of the present invention.

The imaging part 110 may include cameras 310, a display 320, a microphone 330 and a speaker 340.

The camera 310 may be the camera module for augmentation which was explained in FIG. 2. In other words, the camera 310 may be an RGBD camera.

The cameras 310 may capture images on the user's side. The cameras 310 may create information on the images on the user's side by capturing them. The communication part 130 may transmit information on the images thereon to the other user's communication device 100.

In accordance with one example embodiment of the present invention, the cameras 310 may capture a 3D image of an upper body of the user. The cameras 310 may be attached on both left and right sides of the display 320 to capture a frontal face of the user as in details as possible. For example, the cameras 310 may include two cameras located in different positions. The two cameras may capture images on the user's side, respectively, on left and right sides and the imaging part 110 may reproduce a 3D image by combining the captured images on the left and the right sides. In accordance with one example embodiment of the present invention, the method for reproducing information on the 3D image will be explained below in details by referring to FIG. 4. Thereafter, the communication part 130 may transmit the 3D image to the other user's communication device 100.

The display 320 may display the image on the side of the other user by using the information on the image of the other user transmitted from the communication part 130 of the other user's communication device 100.

In accordance with one example embodiment of the present invention, the display 320 may be a 3D display. The display 320 may display the 3D image on the side of the other user by using information on the 3D image of the other user transmitted from the communication part 130 thereon.

The microphone 330 may receive sound on the user's side. The microphone 330 may create information on the sound of the user by receiving the sound. Then, the communication part 130 may transmit information on the sound on the user's side to the other user's communication device 100.

The speaker 340 may output the sound on the other user's side by using information on the sound on the side of the other user transmitted from the communication part 130 of the other user's communication device 100.

Figure 4:
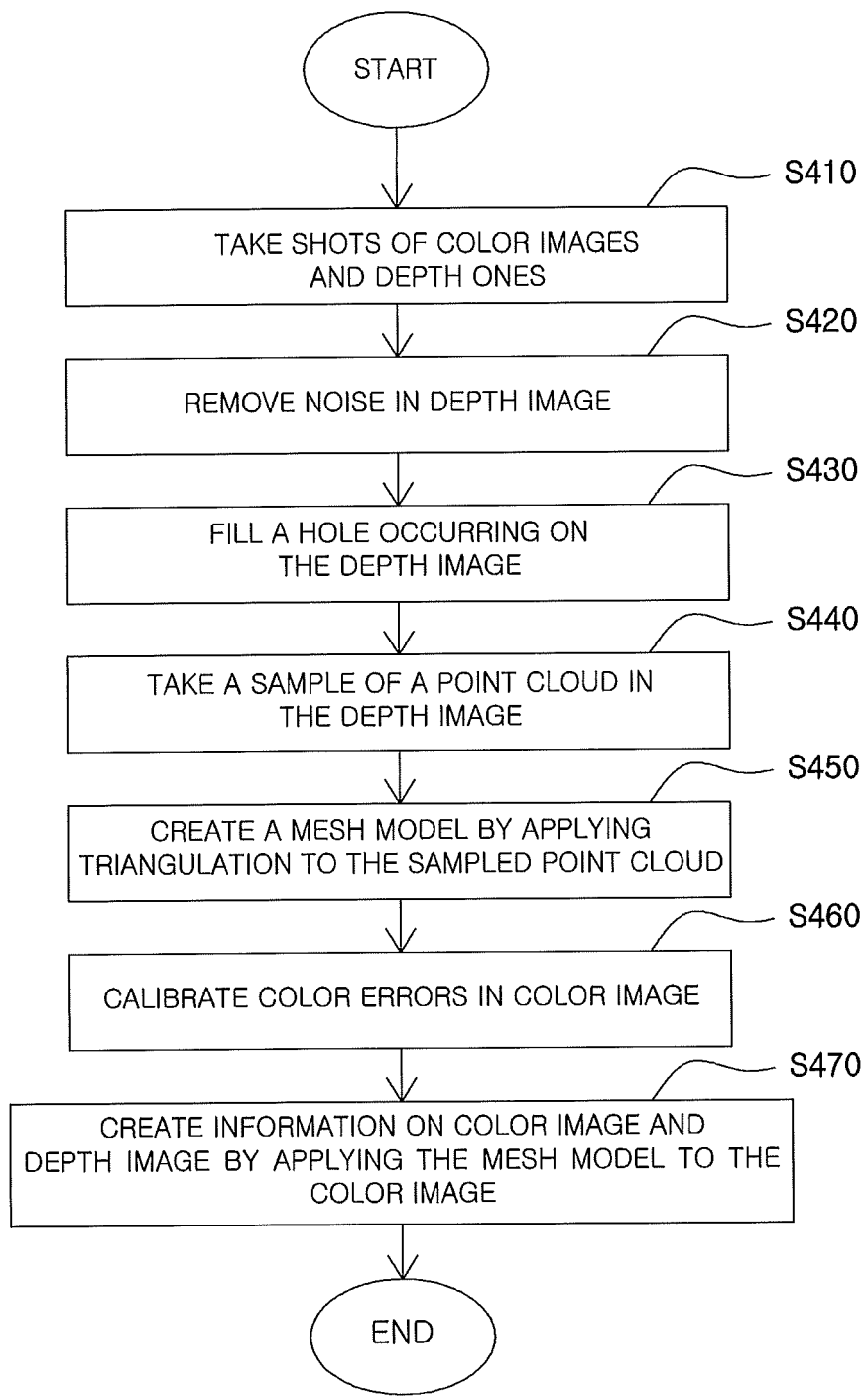
FIG. 4 is a flowchart of a method for creating information on a 3D image in accordance with one example embodiment of the present invention.

FIG. 4 is a flowchart of a method for creating information on a 3D image in accordance with one example embodiment of the present invention.

As explained above by referring to FIG. 3, the cameras 310 may include two RGBD cameras placed on different positions.

(i) First of all, the two RGBD cameras may take shots of color images and depth ones on different positions on the user's side at a step of S410.

A process for creating a mesh model by using the depth images may be performed.

(ii) The imaging part 110 may remove noise in each of two depth images by applying a bilateral filter to each of the two depth images at a step of S420.

(iii) The imaging part 110 may fill a hole occurring on each depth image by using depth values around the hole at a step of S430. In other words, the imaging part 110 may allocate a depth value selected among depth values of one or more neighboring pixels of the hole pixel in the depth image, an average value of the depth values thereof and a value determined according to a certain rule based on the neighboring pixels thereof to the hole pixel.

The depth images revised by the prescribed steps S410 through S430 may be created.

(iv) The imaging part 110 may take a sample of a point cloud in the revised depth image at a step of S440.

(v) The imaging part 110 may create a mesh model by applying triangulation to the sampled point cloud at a step of S450.

Next, if the mesh model is created, a work of wearing colors to the mesh model may be performed by using color images.

(vi) The imaging part 110 may calibrate color errors in respective color images taken shots of at two different positions at a step of S460.

(vii) The imaging part 110 may create information on corresponding final color images and depth images by applying the color images whose color errors has been calibrated to the mesh model at a step of S470. The final color images and the depth images may include the user's face and upper body.

Then, the imaging part 110 of the other user's communication device 100 may display an image on the user's side as a 3D image by using the information on the color images and the depth images.

Figure 5:
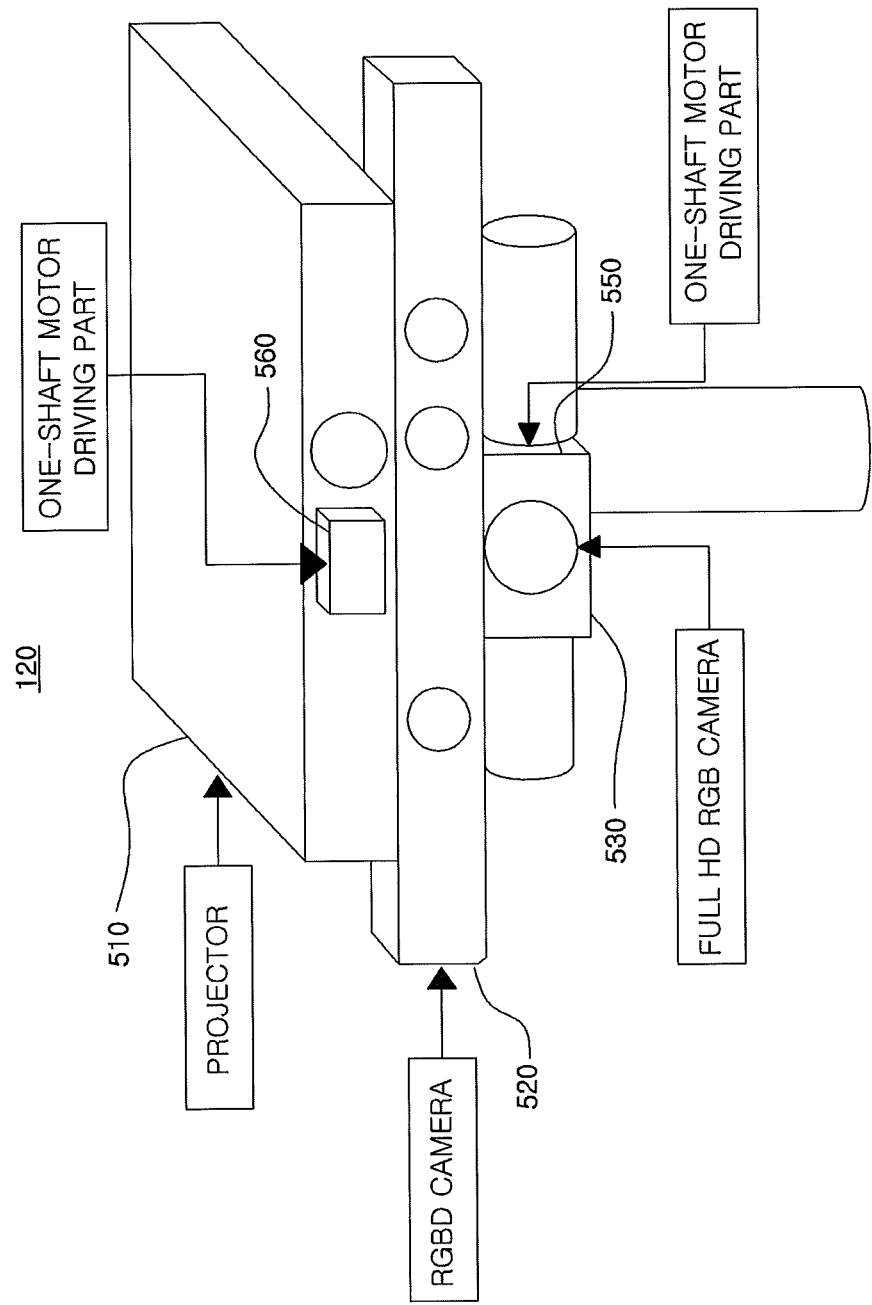
FIG. 5 explains a configuration of an augmentation part in accordance with one example embodiment of the present invention.

FIG. 5 explains a configuration of an augmentation part in accordance with one example embodiment of the present invention.

The augmentation part 120 may include a projector 510, an RGBD camera 520, a full HD RGB camera 530, a two-shaft motor driving part 550 and a one-shaft motor driving part 560.

The projector 510 may augment an image to the physical 3D object by projecting the image to the physical 3D object. The image may include a character, a photo, etc. In addition, the image may include the other user's manipulation information. In other words, if the other user's manipulation information is transmitted from the other user's communication device 100, the projector 510 may provide the user with the result of the augmentation of the other user's manipulation information on the physical 3D object by projecting the transmitted manipulation information as an image onto the physical 3D object.

The RGBD camera 520 may take shots of an augmented region onto which the manipulation information is projected on the user's side. The RGBD camera 520 may create a color image and a depth image of the augmented region by taking shots of the augmented region on the user's side. In the augmented region, the physical 3D object may be placed or the virtual 3D object may be displayed. The color image and the depth image of the augmented region may include the physical 3D object or the virtual 3D object and also may include an environment thereof.

The RGBD camera 520 may be used to identify a 3D shape of the physical 3D object. In addition, the RGBD camera 520 may be used to track the user's body. If the user manipulates the physical 3D object or the virtual 3D object, the user's body may be tracked to identify the 3D object-related manipulation.

The full HD RGB camera 530 may take shots of the augmented region on the user's side. However, since the full HD condition is not always required, it is clearly made sure that the claim scope of the present invention is not limited to the full HD one and accordingly, it is called a "color camera" in the claims. The full HD RGB camera 530 may capture an environment including the 3D object in the augmented region by taking shots of the augmented region on the user's side.

Furthermore, the RGBD camera 520 and the full HD RGB camera 530 may be used to track the 3D object.

The RGBD camera 520 and the full HD RGB camera 530 may be attached to the two-shaft motor driving part 550. The two-shaft motor driving part 550 may enlarge the augmented region by moving to left or right or forwards or backwards. Herein, the augmented region represents a region where an image may be displayed by the projector 510 and may be taken shots of by the RGBD camera 520 and the full HD RGB camera 530. For example, in the aforementioned steps by referring to FIG. 2, the communication device 100 may use the two-shaft motor driving part 550 to which the RGBD camera 520 is attached in order to move the RGBD camera 520 to a position fit for a position of the physical 3D object or the virtual 3D object.

Besides, the projector 510 may be attached to the one-shaft motor driving part 560. Or the lens of the projector 510 may be combined with the one-shaft motor driving part 560. The one-shaft motor driving part 560 may move the projector 510 or its focus forwards or backwards. To augment information on a moving object, the one-shaft motor driving part 560 may adjust the focal distance of the projector 510 in real time. To adjust the focal distance of the projector 510 in real time, the one-shaft motor driving part 560 may manipulate the lens part of the projector 510. For instance, in the steps explained by referring to FIG. 2, the first communication device 210 may set the focus of the lens by referring to a distance between the physical 3D object and the projector 510 by using the one-shaft motor driving part 560 combined with the les of the projector 510. Besides, the second communication device 220 may augment the result of the physical 3D object being manipulated by the user of the first communication device 210 on the whole surface of the virtual 3D object by using the projector 510 of the second communication device 220.

In accordance with one example embodiment of the present invention, the RGBD camera 520 may track the user's manipulation point, e.g., the user's index fingertip. The augmentation part 120 may separate the shapes of the 3D object and the user's manipulation point from the shot image. To separate the shape of the manipulation point (i.e., the user's hand or finger), the augmentation part 120 may separate a region of the manipulation point from the color image and the depth image by using the depth image and convert the separated region to a binary image. The augmentation part 120 may extract a region of a convex hull from the binary image, and then detect the central point of the extracted region. The augmentation part 120 may define a vertex furthest away from the central point in the extracted region as the end of the manipulation point and estimate the x-, y-, and z-coordinates of the end of the manipulation point.

In accordance with one example embodiment of the present invention, if the x-, y-, and z-coordinates of the end of the manipulation point are estimated, the augmentation part 120 may determine whether the 3D object is touched by the manipulation point or not by comparing the z-coordinate of the object and that of the end of the manipulation point. For example, if the difference between the z-coordinate of the 3D object and that of the end of the manipulation point is less than a certain threshold value, the augmentation part 120 may determine that the 3D object is touched.

Method for Creating Virtual Object

Figure 6:
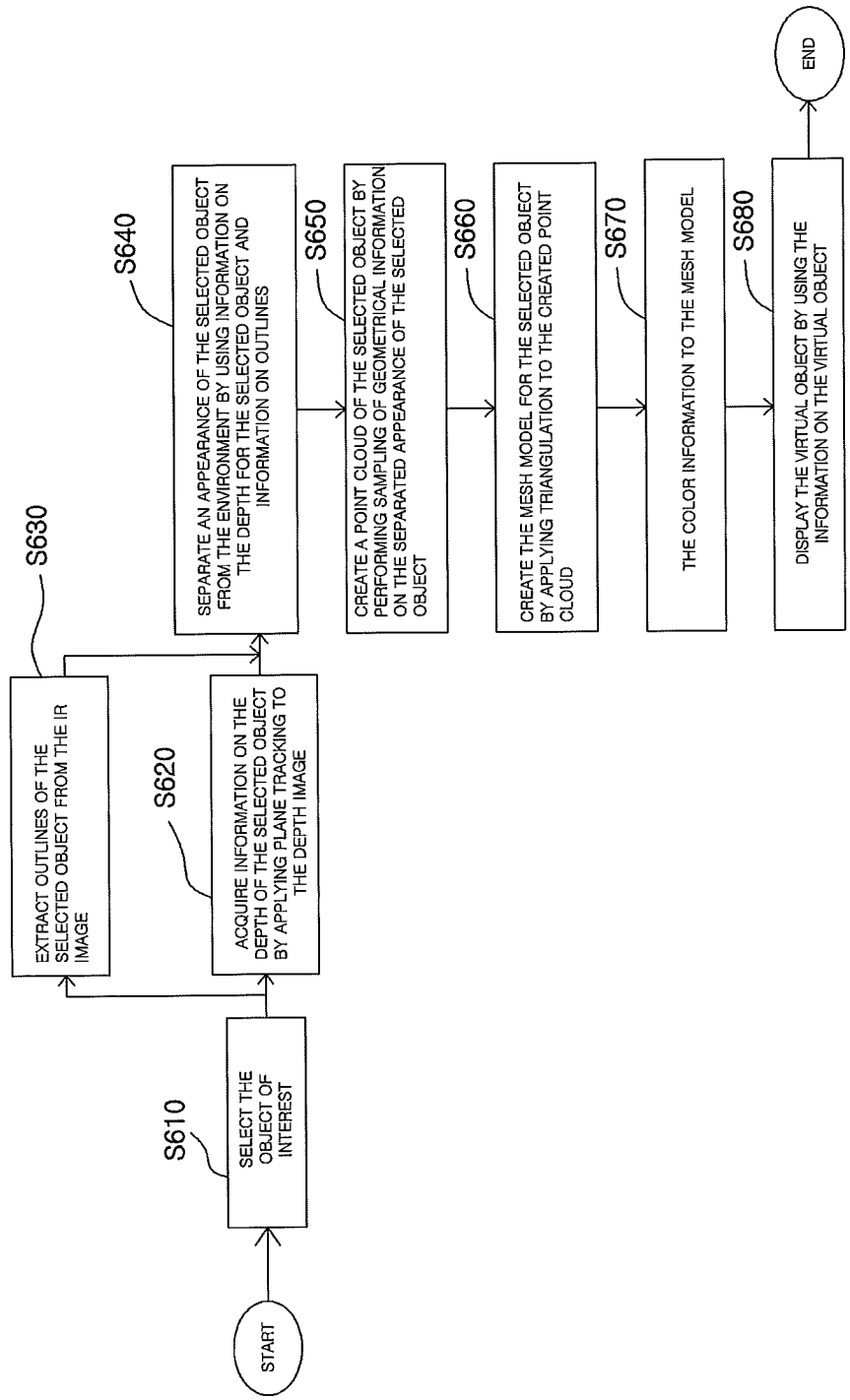
FIG. 6 is a flowchart of a method for sharing a remote 3D object in accordance with one example embodiment of the present invention.

FIG. 6 is a flowchart of a method for sharing a remote 3D object in accordance with one example embodiment of the present invention.

To make two users share the 3D object at a remote place or a local place, the physical 3D object may be placed on the augmented region on the user's side, and the virtual 3D object may be placed on the augmented region on the other user's side. Herein, the virtual 3D object is created by applying the 3D surface modeling method to the physical 3D object.

As stated above by referring to FIG. 5, at the step S230, the RGBD camera 520, etc. of the augmentation part 120 may acquire the information on the color images and the depth images for the augmented region where the physical 3D object is located. At the step S230 as stated above by referring to FIG. 2, information relating to the physical 3D object may include information on the color images and the depth images for the augmented region where the physical 3D object is placed.

At the step S231 as stated above by referring to FIG. 2, the information on the color images and the depth images may be transmitted to the other user's communication device 100 through a network between the communication part 130 of the user's communication device 100 and that of the other user's communication device 100.

At the step S232 as stated above by referring to FIG. 2, the other user's communication device 100 may display the virtual 3D object by using the information on the color images and the depth images for the augmented region. In accordance with one example embodiment of the present invention, a method for generating a virtual object corresponding to the physical object by extracting information on the physical 3D object from the information on the color images and the depth images for the augmented region will be explained below. The step S232 may include the following steps S610 through S680.

The information on the color images and the depth images for the augmented region on the user's side, received by the other user's communication device 100, may not only include the physical 3D object itself but also an environment around the physical 3D object. In other words, color image pixels have color values with respect to the environment including the physical 3D object, and the depth image pixels have the depth values with respect to the environment including the physical 3D object. The depth value of the environment may be acquired through the depth image.

In addition, if there are several 3D objects, an object of interest as a target of the interaction between the user and the other user among all the 3D objects is necessary to be determined. In short, the object of interest may be a 3D object as the target of the interaction between the user and the other user among one or more 3D objects located in the augmented region on the user's side.

(i) If there are multiple 3D objects, the augmentation part 120 may select one of multiple 3D objects as the object of interest at a step of S610. If there is only one 3D object, the step S610 may be omitted. If the 3D object is selected, the selected 3D object may be separated in the environment where the color image and the depth image appear.

(ii) To separate the selected 3D object from the environment, the augmentation part 120 may acquire information on the depth of the selected 3D object by applying plane tracking to the depth image at a step of S620.

In general, it may be assumed that the object of interest would be placed on a table in the augmented region. On assumption that the selected 3D object is placed on the table, the augmentation part 120 may extract the plane information on the table where the selected 3D object is placed in real time by using a model based pose estimation, e.g., a particle filter, and acquire the depth information of the selected 3D object, i.e., the depth values of pixels showing the selected 3D object, by subtracting the depth value(s) corresponding to the extracted plane information from that of the depth image(s).

In accordance with one example embodiment of the present invention, the depth image may include an infrared (i.e., "IR") image. For example, the information relating to the physical 3D object stated by referring to FIG. 2 may include information on an IR depth image. The communication device 100 may separate the physical 3D object from the environment, i.e., information relating to the physical 3D object, by using the IR depth image. Since the IR image is not influenced by a light, the selected 3D object may be extracted more delicately from the environment by using the IR depth image.

(iii) The augmentation part 120 may extract outlines of the selected 3D object from the IR depth image at a step of S630. As explained above, in accordance with one example embodiment of the present invention, a method for extracting outlines which uses the IR depth image would be better compared to that which uses color features because the projector 510 augments colors on the surface of the physical 3D object.

In accordance with one example embodiment of the present invention, the augmentation part 120 may acquire the outlines of the selected 3D object by using the Canny operator for the IR depth image and adjusting a threshold of the Canny operator.

(iv) The augmentation part 120 may separate an appearance of the selected 3D object from the environment by using the acquired information on the depth for the selected 3D object and the acquired information on outlines of the selected 3D object at a step of S640.

(v) The augmentation part 120 may create a point cloud of the selected 3D object by performing sampling of geometrical information (X, Y, and Z) on the separated appearance of the selected 3D object at a step of S650.

(vi) The augmentation part 120 may create the mesh model for the selected 3D object by applying triangulation to the created point cloud at a step of S660.

(vii) The augmentation part 120 may extract information on the color of the surface of the selected 3D object from the color image and create information on the virtual 3D object by applying the color information to the created mesh model at a step of S670.

In accordance with one example embodiment of the present invention, the information on the virtual 3D object may include the information on the color images and the depth images thereof.

(viii) The projector 510 of the augmentation part 120 may display the virtual 3D object corresponding to the physical 3D object by using the information on the virtual 3D object at a step of S680. In accordance with one example embodiment of the present invention, since the projector 510 displays the virtual 3D object on the table in front of the other user, the user and the other user can perform the interaction with respect to the physical 3D object and the virtual 3D object, respectively.

Figure 7:
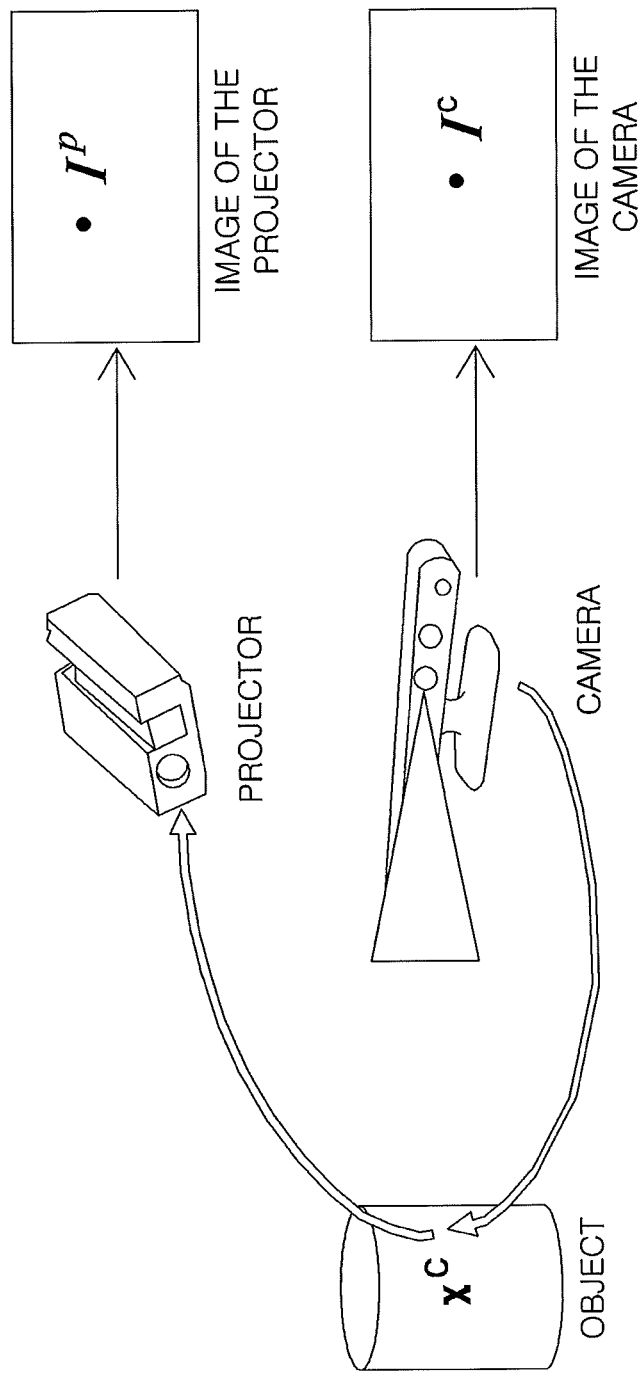
FIG. 7 explains a method for augmenting an image on the 3D object in accordance with one example embodiment of the present invention.

FIG. 7 explains a method for augmenting an image on the 3D object in accordance with one example embodiment of the present invention.

As explained above, in accordance with one example embodiment of the present invention, the projector 510 is used to augment the image on the surface of the 3D object shared as the physical 3D object and the virtual 3D object by the user and the other user. The user's communication device 100 with the physical 3D object and the other user's communication device 100 with the virtual 3D object may augment the image in different ways. To make the augmentation part 120 of the user's communication device 100 augment the image exactly on the surface of the 3D object, image calibration depending on positions among the 3D object, the projector 510 and the cameras is required where the camera may be the RGBD camera 520 which may take shots of the depth image as stated above by referring to FIG. 5.

As explained at the step S640 by referring to FIG. 6, the appearance of the 3D object may be extracted from the depth image acquired by the camera. Because the camera and the projector 510 are attached to each other, the geometric information (i.e., x, y, and z as coordinate values of the points) on the appearance of the 3D object relevant to a view from the camera may be extracted.

In accordance with one example embodiment of the present invention, the following equation 1 may represent a method for obtaining an image coordinate of the projector 510 with respect to $x^c$ as one point extracted from the appearance of the 3D object.

$$I^p = K_p [R_c^p | T_c^p] K_c^{-1} (z * I^c) \qquad \text{Equation 1}$$

Where $I^c$ may be the image coordinate of the camera; $I_p$ may be the image coordinate of the projector 510; z may be a depth value; $K_c$ may be an intrinsic matrix of the camera; $K_p$ may be an intrinsic matrix of the projector 510; $R_c^p$ may be a rotation matrix; and $T_c^p$ may be a translation vector. In FIG. 1, $x^c$ may be a 3D coordinate of a specific point of the 3D object. In other words, $I^c$ may be an image coordinate of the camera corresponding to a 3D coordinate xc; $I^p$ may be an image coordinate of the projector 510 corresponding to the 3D coordinate xc; and $I^c$ and $I^p$ may fulfill the equation 1.

Under the equation 1, the augmentation part 120 may acquire $I^p$ as the image coordinate of the projector 510 from $I^c$ as the image coordinate of the camera. Z may be acquired from the camera. Respective values of $K_c$, $K_p$, $R_c^p$, $T_c^p$ and $x_c$ may be acquired by calibration between the camera and the projector 510. For example, a homography between the camera and the projector 510 may be calculated by the calibration therebetween, and corresponding points from images of the camera and the projector 510 may be acquired according to the homography. In addition, the aforementioned parameter solutions may be acquired by applying Zhang's method to the corresponding points.

Figure 8:
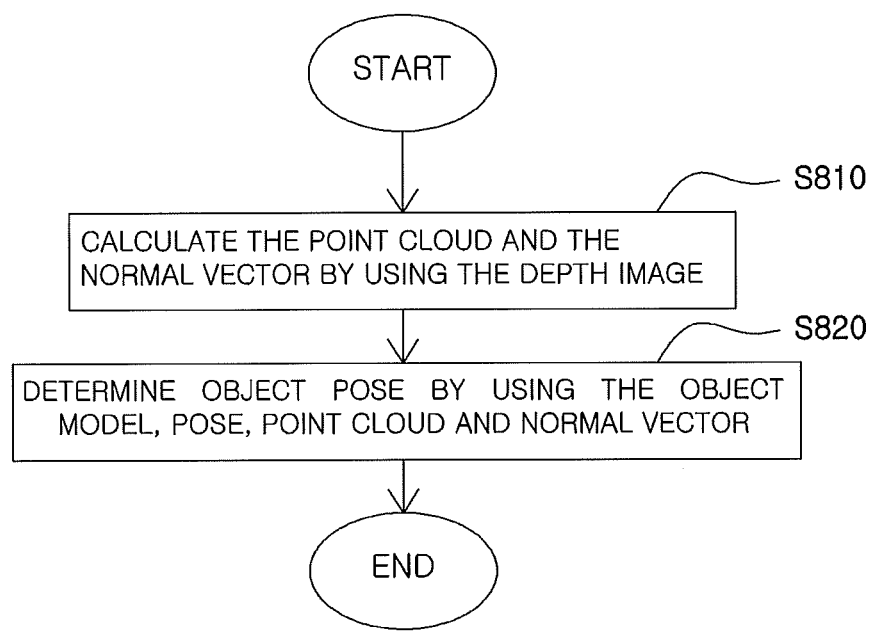
FIG. 8 explains position tracking of the 3D object and augmentation of an image thereof in accordance with one example embodiment of the present invention.

FIG. 8 explains position tracking of the 3D object and augmentation of an image with respect to the 3D object in accordance with one example embodiment of the present invention.

To continuously augment the image transmitted from the user's side onto the surface of the 3D object on the side of the other user, the 3D object should be tracked in real time. In the following example embodiment, a method for tracking the 3D object by using the model based pose estimation, e.g., the particle filter, is explained.

In accordance with one example embodiment of the present invention, the communication device 100 may have a 3D object model in advance. The communication part 130 of the user's communication device 100 may transmit the 3D object model to the communication part 130 thereof through a network. The other user's communication device 100 may track the 3D object by using the transmitted 3D object model.

In accordance with one example embodiment of the present invention, a network 3D object model may be a 3D model representing the 3D object. The 3D model may include information on model points, normal vector, and indexes and textures for composing a mesh. As explained above, if the projector 510 is used, the texture information is difficult to be used to track the 3D object due to interference caused by ray displayed from the projector 510. Accordingly, the information on the model points and the normal vector may be used to track the 3D object in the example embodiment as shown below.

To calculate the normal vector of the environment, the augmentation part 120 may use the depth image created by the camera. In accordance with one example embodiment of the present invention, the camera may be the RGBD camera 520 as stated above by referring to FIG. 5. Below is an explanation on a method for determining an object pose in accordance with one example embodiment of the present invention.

(i) The augmentation part 120 may calculate the point cloud and the normal vector by using the depth image at a step of S810.

(ii) The augmentation part 120 may determine a 3D object pose by using the 3D object model, the 3D pose, the point cloud and the normal vector at a step of S820. In accordance with one example embodiment of the present invention, a previous pose of the 3D object pre-determined to determine the 3D object pose may be used. Besides, the initial 3D object pose may be used as a first determination.

To consider only a visible part in the camera among the information which composes the model, the augmentation part 120 may remove information on a part invisible by the camera.

In accordance with one example embodiment of the present invention, an objective function may be defined as shown in equations 2 and 3 below to determine the 3D object pose.

First of all, $S_i$ as a sample used for the particle filter may be defined as shown in the equation 2.

$$S_i = (\theta_x, \theta_y, \theta_z, p_x, p_y, p_z) \qquad \text{Equation 2}$$

$\theta_x$, $\theta_y$, and $\theta_z$ may represent respective angles relevant to x-, y-, and z-axes. $p_x$, $p_y$, and $p_z$ may represent respective positions relevant to x-, y-, and z-axes.

Next, the objective function may be defined as shown in the equation 3.

Equation 3

$$\text{pose} = \operatorname{argmin}_{\{s_i\}} \sum_{P_i, N_i \in \text{model}} (R(\theta_x, \theta_y, \theta_z) * N_i - N_{env}) *$$

$$(R(\theta_x, \theta_y, \theta_z) * P_i + T(p_x, p_y, p_z) - T_{encv})$$

$N_i$ may be a normal vector of the model and $P_i$ may be information on a point thereof. $R(\theta_x, \theta_y, \theta_z)$ may be a rotation matrix of $\theta_x$, $\theta_y$, and $\theta_z$ while $N_{env}$ may be a normal vector of the environment. $T(p_x, p_y, p_z)$ may be a translation vector of $p_x$, $p_y$, and $p_z$. $T_{env}$ may be a translation vector of the environment.

In accordance with one example embodiment of the present invention, if the current sample among all samples is applied, the augmentation part 120 may determine a sample of the multiplication of a first value between normal vectors and a second value between pieces of position information, which is minimal, as a final 3D object pose.

To augment the image on the surface of the 3D object continuously, the object must exist all the time within the output range of the projector 510. In accordance with one example embodiment of the present invention, the augmentation part 120 may place the 3D object or the object of interest on a center of the camera all the time by manipulating the projector 510 and the two-shaft motor driving part 550 where the camera is attached.

In accordance with one example embodiment of the present invention, to manipulate the two-shaft motor driving part 550, the calibration between the camera and the two-shaft motor driving part 550 may be required. During the course of calibration, first of all, the augmentation part 120 may acquire a fixed pattern as an image while moving the motor of the two-shaft motor driving part 550 at the already known angle. Next, the augmentation part 120 may detect the corresponding points among the acquired images. The augmentation part 120 may calculate conversion relation between camera coordinates and motor coordinates by using the fact that the detected corresponding points must be converted into a same position when they are converted into a certain coordinate system. The augmentation part 120 may calculate an angle of the motor placed in the center of the image in which 3D object is taken a shot of as the subject of tracking by using the calculated translation and may drive the motor of the two-shaft motor driving part 550 at the calculated angle.

In accordance with one example embodiment of the present invention, the augmentation part 120 may change the focal distance of the lens of the projector 510 depending on the distance between the object and the projector 510. To change the focal distance of the lens, the augmentation part 120 may control the one-shaft motor driving part 560 combined with the lens of the projector 510. First of all, the augmentation part 120 may measure a value of the motor which sets the focus of the projector 510 depending on the distance between the 3D object and the projector 510. Herein, the value of the motor may represent a position of the motor of the one-shaft motor driving part 560. Next, the augmentation part 120 may acquire a quadratic function between the distance value and the motor value by using the acquired values of the motor. The augmentation part 120 may control to make the motor have a proper value depending on the distance by using the quadratic function.

In accordance with the present invention, multiple users may share a 3D object existing on a remote or a local space with one another and perform interactions with respect to the shared 3D object.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for making a first and a second communication devices support for interactions with respect to a three-dimensional (3D) object, comprising steps of:
   (a) allowing the first communication device to acquire information relating to a physical 3D object by taking shots of the physical 3D object in use of a camera module for augmentation and to acquire information on images of a user of the first communication device by taking shots of the user in use of a camera module for acquiring an image of a person;
   (b) allowing the second communication device to receive the information relating to the physical 3D object and the information on images of the user of the first, communication device from the first communication device, then display a virtual 3D object corresponding to the physical 3D object as a 3D image by using the received information relating to the physical 3D object and display a 3D avatar of the user of the first communication device by using the received information on the images of the user of the first communication device;
   (c) allowing the first communication device to transmit information on manipulation of the user of the first communication device regarding the physical 3D object and information on images of the user of the first communication device who is manipulating the physical 3D object, if being acquired, to the second communication device and then allowing the second communication device to display a state of the 3D avatar of the user of the first communication device who is manipulating the virtual 3D object by using a display unit and a projector of the second communication device;
   wherein, at the step of (a), the information relating to the physical 3D object includes information on color images and depth images and the first communication device acquires information on depth values of the physical 3D object by applying plane tracking for the depth images; and
   wherein the first communication device extracts plane information on a table on which the physical 3D object is placed by using a model based pose estimation and acquire the information on the depth values of the physical 3D object by subtracting depth values corresponding to the extracted plane information from depth values of the depth images.

2. The method of claim 1, wherein the step (b) further includes a step of: allowing the first communication device to receive information on images of a user of the second communication device from the second communication device and then display a 3D avatar of the user of the second communication device by using the received information thereon; and
   wherein the step (c) further includes a step of: allowing the second communication device to transmit information on manipulation of the user of the second communication device regarding the virtual 3D object and information on images of the user of the second communication device, if being acquired, to the first communication device and then allowing the first communication device to display a state of the 3D avatar of the user of the second communication device who is manipulating the virtual 3D object by using a display unit and a projector of the first communication device.

3. The method of claim 1, wherein, at the step of (a), the information relating to the physical 3D object includes information on infrared depth images and the first communication device separates the physical 3D object from environment relating to the physical 3D object by using the information on the infrared depth images.

4. The method of claim 1, wherein, at the step of (a), the first communication device moves the camera module for augmentation to a position fit for a position of the physical 3D object by using a two-shaft motor driving part to which the camera module for augmentation is attached.

5. The method of claim 1, wherein, at the step of (a), the first communication device adjusts a focus of lens of a projector of the first communication device depending on distance between the physical 3D object and the projector by using a one-shaft motor driving part combined with the lens.

6. The method of claim 1, wherein the second communication device augments a result of the physical 3D object being manipulated by the user of the first communication device on a surface of the virtual 3D object by using a projector of the second communication device.

7. A system for supporting an interaction with respect to a 3D object, comprising:
   a first communication device for taking shots of a physical 3D object; and
   a second communication device for outputting a virtual 3D object corresponding to the physical 3D object;
   wherein the first communication device acquires the information relating to the physical 3D object by taking shots of the physical 3D object in use of a camera module for augmentation and acquires information on images of a user of the first communication device by taking shots of the user of the first communication device in use of a camera module for acquiring an image of a person;
   wherein the second communication device receives the information relating to the physical 3D object and the information on images of the user of the first communication device from the first communication device, then displays a virtual 3D object corresponding to the physical 3D object as a 3D image by using the received information relating to the physical 3D object and displays a 3D avatar of the user of the first communication device by using the received information on the images of the user of the first communication device;
   wherein the first communication device transmits information on manipulation of the user of the first communication device regarding the physical 3D object and information on images of the user of the first communication device who is manipulating the physical 3D object to the second communication device and then the second communication device displays a state of the 3D avatar of the user of the first communication device who is manipulating the virtual 3D object by using a display unit and a projector of the second communication device
   wherein the information relating to the physical 3D object includes information on color images and depth images and the first communication device acquires information on depth values of the physical 3D object by applying plane tracking for the depth images; and
   wherein the first communication device extracts plane information on a table on which the physical 3D object is placed by using a model based pose estimation and acquires the information on the depth values of the physical 3D object by subtracting depth values corresponding to the extracted plane information from depth values of the depth images.

8. The system of claim 7, wherein the first communication device receives information on images of a user of the second communication device from the second communication device and then displays a 3D avatar of the user of the second communication device by using the received information thereon, and transmits information on manipulation of the user of the second communication device regarding the virtual 3D object and information on images of the user of the second communication device, if being acquired, to the first communication device, and then the first communication device displays a state of the 3D avatar of the user of the second communication device who is manipulating the virtual 3D object by using a display unit and a projector of the first communication device.

9. The system of claim 7, wherein the information relating to the physical 3D object includes information on infrared depth images and the first communication device separates the physical 3D object from environment relating to the physical 3D object by using the information on the infrared depth images.

10. The system of claim 7, wherein the first communication device moves the camera module for augmentation to a position fit for a position of the physical 3D object by using a two-shaft motor driving part to which the camera module for augmentation is attached.

11. The system of claim 7, wherein the first communication device adjusts a focus of lens of a projector of the first communication device depending on distance between the physical 3D object and the projector by using a one-shaft motor driving part combined with the lens.

12. The system of claim 7, wherein the second communication device augments a result of the physical 3D object being manipulated by the user of the first communication device on a surface of the virtual 3D object by using a projector of the second communication device.

* * * * *